(12) United States Patent
Bowen et al.

(10) Patent No.: US 7,551,918 B2
(45) Date of Patent: Jun. 23, 2009

(54) MOBILE DEVICE CONTROL OF MOBILE TELEVISION BROADCAST SIGNALS TO MULTIPLE DESTINATIONS

(75) Inventors: Toby John Bowen, Durham, NC (US); Leland Scott Bloebaum, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 693 days.

(21) Appl. No.: 11/163,645

(22) Filed: Oct. 26, 2005

(65) Prior Publication Data

US 2007/0093199 A1 Apr. 26, 2007

(51) Int. Cl.
*H04M 3/42* (2006.01)

(52) U.S. Cl. ................. 455/414.1; 455/414.4; 455/306; 455/186.1; 455/418; 455/566; 725/62; 725/106

(58) Field of Classification Search ................ 455/3.03, 455/3.04, 3.06, 186.1, 418, 466, 566; 725/58, 725/62, 63, 73, 74, 86, 105, 106, 115, 135, 725/142
See application file for complete search history.

(56) References Cited

U.S. PATENT DOCUMENTS

| | | | |
|---|---|---|---|
| 2003/0060157 A1 | 3/2003 | Henrick | |
| 2004/0214541 A1* | 10/2004 | Choi | 455/186.1 |
| 2005/0201720 A1* | 9/2005 | Toyoshima | 386/46 |
| 2006/0184969 A1 | 8/2006 | Yamamoto et al. | |
| 2007/0099560 A1* | 5/2007 | Bowen et al. | 455/3.06 |
| 2007/0111717 A1* | 5/2007 | Mueller et al. | 455/418 |
| 2008/0235739 A1* | 9/2008 | Coebergh Van Den Braak | 725/86 |

FOREIGN PATENT DOCUMENTS

| | | |
|---|---|---|
| GB | 2388455 | 11/2003 |
| WO | 2005088969 | 9/2005 |

OTHER PUBLICATIONS

Sony Ericsson Mobile Communications AB, International Preliminary Report on Patentability, corresponding to International Patent Application No. PCT/US2006/022658, dated Feb. 14, 2008.
Sony Ericsson Mobile Communications Ab et al., PCT/US2006/022658, International Search Report, Nov. 23, 2006.
Sony Ericsson Mobile Communications Ab et al., PCT/US2006/022658, Written Opinion of the International Searching Authority, Nov. 23, 2006.

* cited by examiner

*Primary Examiner*—Matthew D Anderson
*Assistant Examiner*—Shaima Q Aminzay
(74) *Attorney, Agent, or Firm*—Frederick D. Bailey; Moore & Van Allen, PLLC

(57) ABSTRACT

A portable mobile communications device for controlling the destination of mobile TV programs broadcast by a mobile TV service provider includes a mobile TV device, a processor running a mobile TV redirect application communicable with the mobile TV service provider, and a user interface for controlling the mobile TV device and the mobile TV redirect application such that mobile TV broadcast programs can be simultaneously redirected to an external device in response to input received by the user interface and sent to the mobile TV service provider. The external device can include a home media server or a computer coupled to and communicable with the mobile TV service provider via the Internet.

9 Claims, 4 Drawing Sheets

MOBILE DEVICE CONTROL OF MOBILE TELEVISION BROADCAST SIGNALS TO MULTIPLE DESTINATIONS

BACKGROUND OF THE INVENTION

The present invention relates to portable mobile communications devices and systems, and more particularly to a portable mobile communications device, system and method that can control the distribution of live television broadcast signals from the mobile device.

Portable mobile communications devices such as mobile phones are becoming more sophisticated and include many new features and capabilities. One such feature is the capability to receive mobile broadcast television signals or mobile television or the like, such as digital video broadcast-handheld (DVB-H), digital media broadcast (DMB), integrated services digital broadcast-terrestrial (ISDB-T) or similar technologies. The convenience factor for receiving such broadcasting is high for mobile users. Unfortunately, the mobile user's viewing experience is constrained by the mobile equipment itself, particularly the screen size and resolution of the mobile device.

There are circumstances when a mobile user will be very interested in a current broadcast television offering that he can only view on his mobile device because of his current location. For example, the user may be away from home or not have access to a regular television yet still have some idle time to enjoy a live television broadcast. In such situations, the user can use his mobile device to select and view a live broadcast program. In many of these instances, the user may not have enough time to watch the entire program. Or, the program is of particular interest to the user that he wishes he could enjoy it at a later time on a larger screen at a higher resolution such as a standard television or even a notebook computer.

Currently, there are no provisions addressing the user's dilemma described above. What is needed is a mechanism that allows the user to simultaneously direct the mobile video broadcast from the source to both his mobile device and an alternate device such as a home media server for later consumption.

BRIEF SUMMARY OF THE INVENTION

In accordance with an embodiment of the present invention, there is described a portable mobile communications device for controlling the destination of mobile TV programs broadcast by a mobile TV service provider includes a mobile TV device, a processor running a mobile TV redirect application communicable with the mobile TV service provider, and a user interface for controlling the mobile TV device and the mobile TV redirect application such that mobile TV broadcast programs can be simultaneously redirected to an external device in response to input received by the user interface and sent to the mobile TV service provider. The external device can include a home media server or a computer coupled to and communicable with the mobile TV service provider via the Internet.

In accordance with another embodiment of the present invention, there is described a method of controlling the destination of mobile TV programs broadcast by a mobile TV service provider to the portable mobile communications device. The method comprises receiving input from a user interface on the portable mobile communications device, the input for selecting a broadcast program from a programming channel guide to be broadcast. A prompt, via a display on the portable mobile communications device, is displayed for one or more destinations for the selected broadcast program. Input is then received from a user interface on the portable mobile communications device identifying one or more destinations for the selected broadcast program. The portable mobile communications device causes the redirection of the selected broadcast program from the mobile TV service provider simultaneously to the selected one or more destinations. This is achieved by wirelessly sending a control signal to the mobile TV service provider with instructions to redirect the selected broadcast program from the mobile TV service provider simultaneously to the selected one or more destinations such as a home media server or computer coupled with the mobile TV service provider via the Internet.

The redirection of the selected broadcast program from the mobile TV service provider to one or more destinations can be terminated. Input can be received, in response to a prompt, from a user interface on the portable mobile communications device prompting, via a display on the portable mobile communications device, whether to terminate the redirection of the selected broadcast program from the mobile TV service provider to one or more destinations. Termination is caused by wirelessly sending a control signal to the mobile TV service provider with instructions to terminate redirecting the selected broadcast program from the mobile TV service provider to the selected one or more destinations.

DETAILED DESCRIPTION OF THE INVENTION

Figure 1:
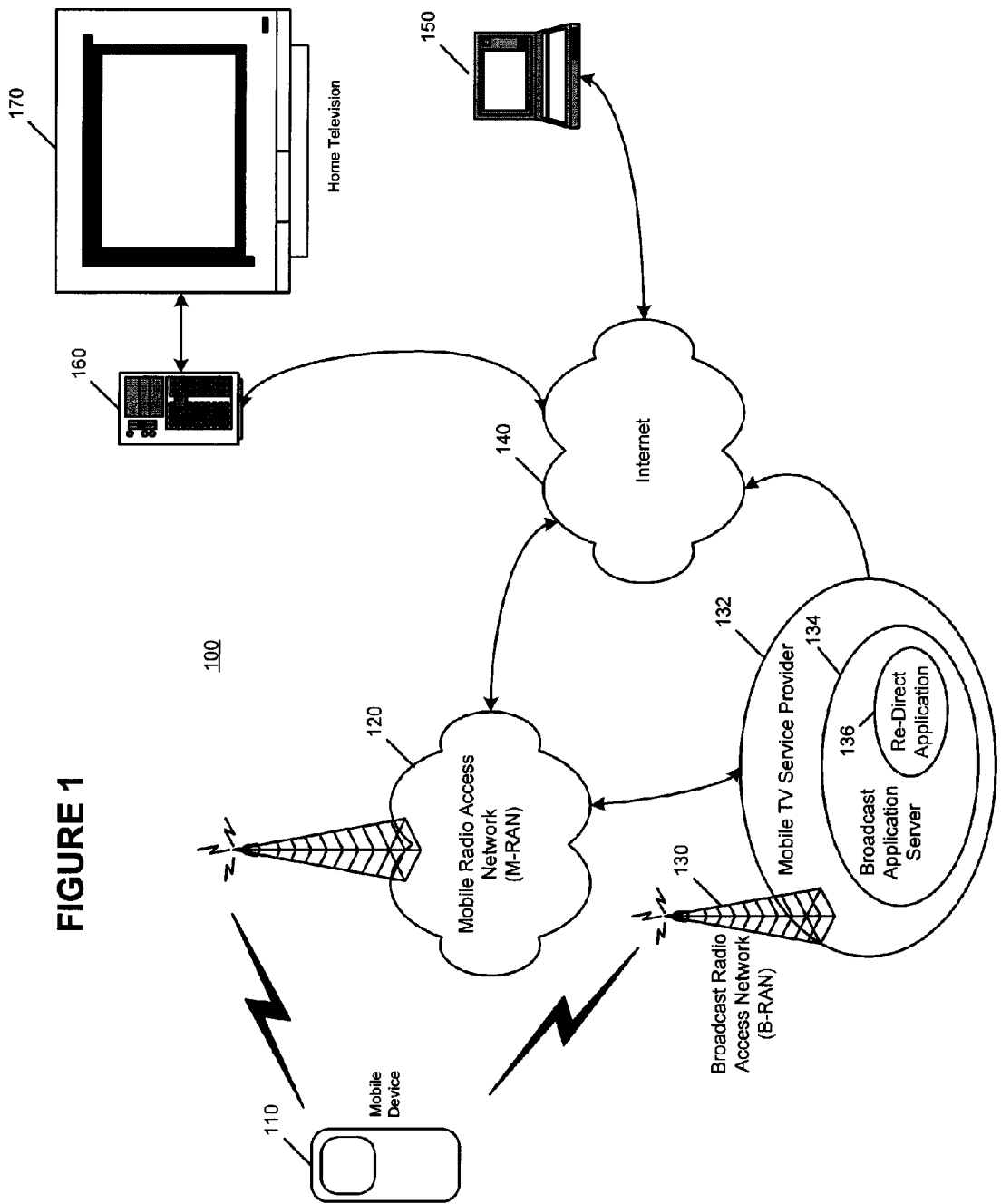
FIG. 1 is a block diagram of an exemplary system for controlling the destination of broadcast mobile television signals in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary system for controlling the destination of broadcast mobile television signals in accordance with an embodiment of the present invention. The system 100 may be a multimedia broadcast multicast system (MBMS) or the like. The portable mobile communications device 110 may be a cordless telephone, cellular telephone, personal digital assistant (PDA), communicator, computer device or the like and is not unique to any particular communications standard, such as Advanced Mobile Phone Service (AMPS), Digital Advanced Mobile Phone Service (D-AMPS), Global System for Mobile Communications (GSM), Code Division Multiple Access (CDMA) or the like. The design of the portable mobile communications device 110 illustrated in FIG. 2 is for purposes of explaining the present invention and the present invention is not limited to any particular design.

Figure 2:
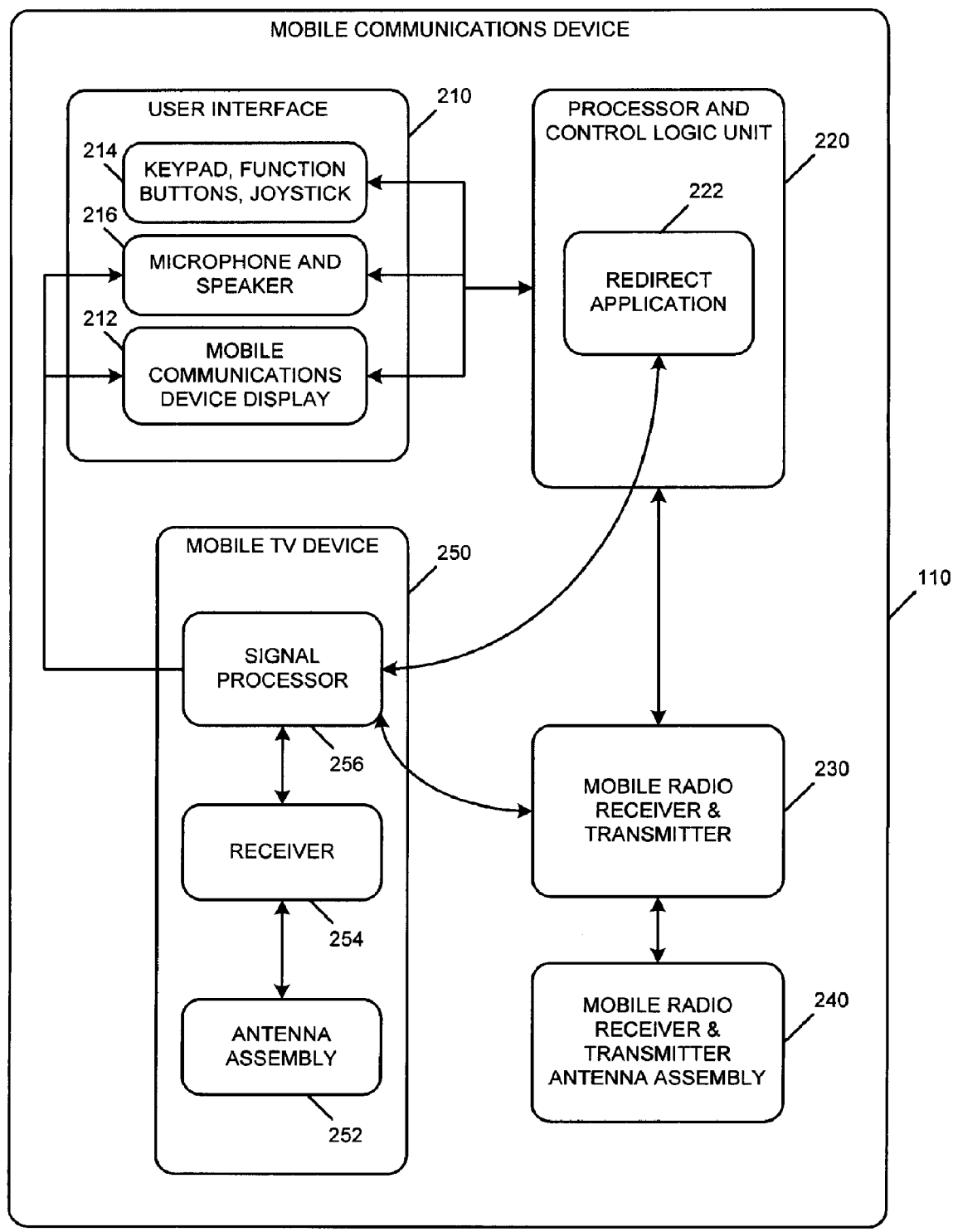
FIG. 2 is a block diagram of an exemplary portable mobile communications device for use within the system of FIG. 1 for controlling the destination of broadcast mobile television signals in accordance with an embodiment of the present invention.

The portable mobile communications device 110 shown in FIG. 2 may include an operator or user interface 210 to facilitate controlling operation of the portable mobile communications device 110 including initiating and conducting phone calls and other communications. The user interface 210 may include a display 212 to provide visual signals to a subscriber or user as to the status and operation of the portable mobile communications device 110. The display 212 may be a liquid crystal display (LCD) or the like capable of presenting color images. The display 212 may provide information to a user or operator in the form of images, text, numerals, characters, a graphical user interface (GUI) and the like. The display 212 may also be used to present programming carried by the broadcast signals described with respect to methods 300 and 400 of FIGS. 3 and 4, respectively.

The user interface 212 may also include a keypad and function keys or buttons 214 including a pointing device, such as a joystick or the like. The keypad, function buttons and joystick 214 permit the user to communicate commands to the portable mobile communications device 110 to dial phone numbers, initiate and terminate calls, establish other communications, such as access to a mobile TV provider, the Internet, send and receive email, text messages and the like. The keypad, function buttons and joystick 214 may also be used to control other operations of the portable mobile communications device 110. The keypad, function buttons and joystick 214 may also be implemented on a touch sensitive display adapted to receive tactile input.

The display 212, keypad, and function buttons 214 may be coupled to a main processor and control logic unit 220. The processor and control logic unit 220 may be a microprocessor or the like. The processor and logic unit 220 may include a feature 222 to enable redirecting broadcast signals to an alternate destination. The functions and operations described with respect to a portable mobile communications device 110 in method 300 of FIG. 3 and method 400 of FIG. 4 may be embodied in the feature 222 for redirecting broadcast signals. The redirecting broadcast signals feature 222 may be embodied in hardware, firmware, software (data structures) or combinations thereof. The processor and logic unit 220 may also include other data structures, software programs, computer applications and the like to encode and decode control signals; perform communication procedures and other functions as described herein.

The user interface 210 may also include a microphone and a speaker 216. The microphone 216 may receive audio or acoustic signals from a user or from another acoustic source. The microphone 216 may convert the audio or acoustic signals to electrical signals. The microphone 216 may be connected to the processor and logic unit 220 wherein the processor and logic unit 220 may convert the electrical signals to baseband communication signals. The processor and control logic unit 220 may be connected to a radio transmitter 230 that may convert baseband signals from the processor and control logic unit 220 to radio frequency (RF) signals. The radio transmitter 230 may be connected to an antenna assembly 240 for transmission of the RF signals to a communication medium or system, such as a mobile radio access network (MRAN) 120 or the like.

The antenna assembly 240 may receive RF signals over the air and transfer the RF signals to a radio receiver 230. The radio receiver 230 may convert the RF signals to baseband signals. The baseband signals may be applied to the processor and control logic unit 220 which may convert the baseband signals to electrical signals. The processor and control unit 220 may send the electrical signals to the speaker 216 which may convert the electrical signals to audio signals that can be understood by the user.

The portable mobile communications device 110 may also include a mobile TV device 250. The mobile TV device 250 may be a DVB-H type device or the like. The mobile TV device 250 may be integrally formed as part of the portable mobile communications device 110 or may be a separate unit that may be connected and operate in association with the portable mobile communications device 110. The mobile TV device 250 may include an antenna assembly 252 for receiving broadcast signals of programming from a mobile TV broadcast network, broadcast radio access network (B-RAN) 130 or the like. A receiver 254 may be coupled to the antenna assembly 252 to receive the broadcast signals. A signal processor 256 may receive the broadcast signals from the receiver 254 and convert the signals to a format for presentation on the display 212 of the portable mobile communications device 110. Or, a signal processor 230 may receive the broadcast signals from the receiver 254 and convert the signals to a format for presentation on the display 212 of the portable mobile communications device 110.

The B-RAN 130 may originate the mobile TV or DVB-H broadcast signals for broadcasting to communications devices or mobile TV devices, such as portable mobile communications device 110 and mobile TV device 250. The B-RAN 130 may include a transmitter to transmit the broadcast signals.

The B-RAN 130 may be connected to a mobile TV service provider 132. The mobile TV service provider 132 may originate programming for broadcasting to communications devices 110 or mobile TV devices 250 via the B-RAN 130. The mobile TV service provider 132 may include a broadcast application server 134. The broadcast application server 134 may include an application 136 for redirecting broadcast signals. At least some of the functions and operations described with respect to the methods 300 and 400 of FIGS. 3 and 4 may be embodied in the broadcast application server 134 and the application 136 for redirecting broadcast signals. The redirecting application 136 may be embodied in hardware, firmware, software (data structures) or combinations thereof.

The B-RAN 130 may be connected to the Internet 140 or other private network that may utilize Internet protocol (IP) or the like. The B-RAN 130 and the mobile TV service provider 132 may receive and transmit signals or messages to control the redirecting of broadcast signals via the Internet 140. Messages and signals to control the playback of recorded programming may also be transmitted and received via the Internet 140 similar to that described with respect to methods 300 and 400 of FIGS. 3 and 4.

Figure 3:
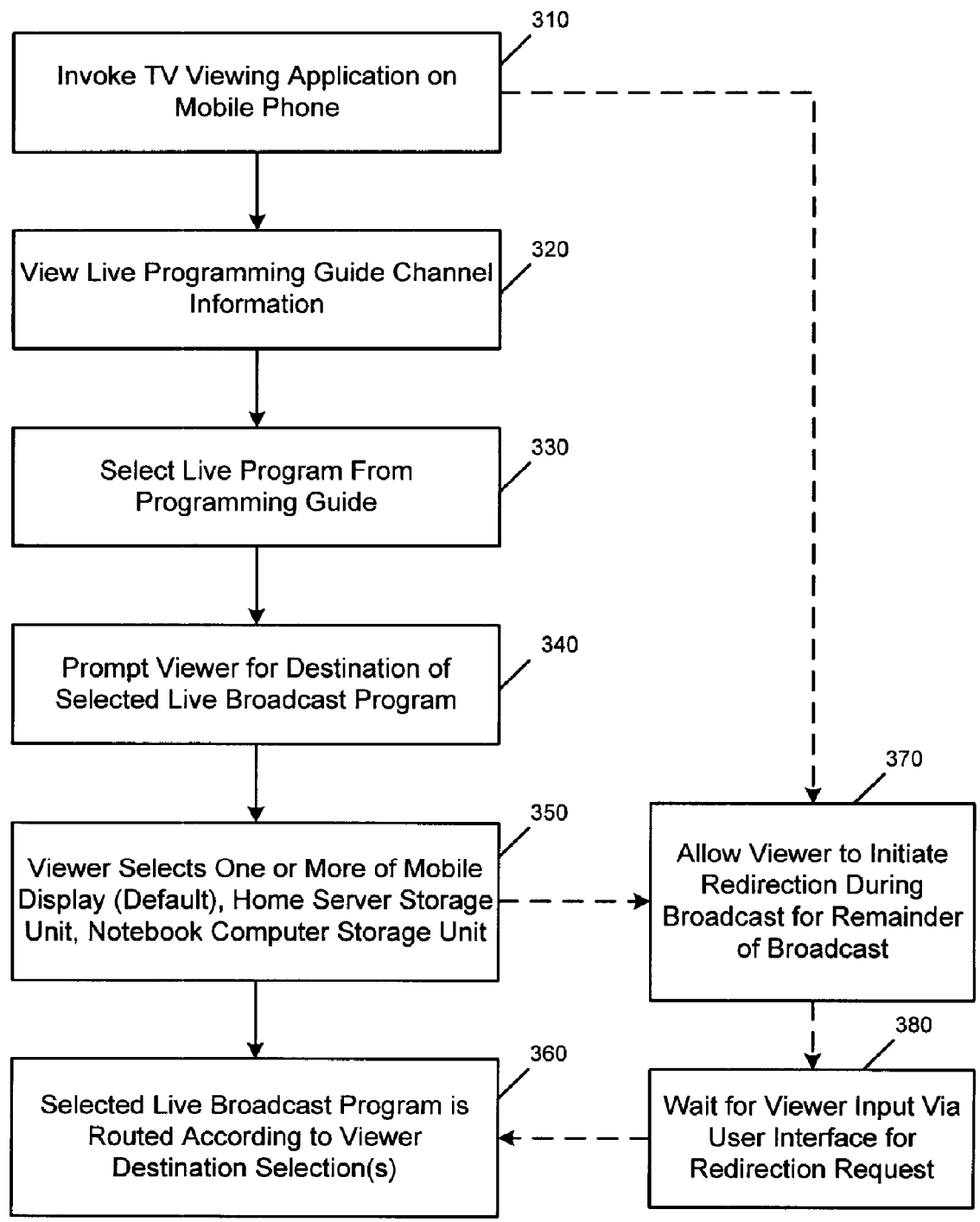
FIG. 3 is a flow chart of a method for controlling the destination of broadcast mobile television signals in accordance with an embodiment of the present invention.
Figure 4:
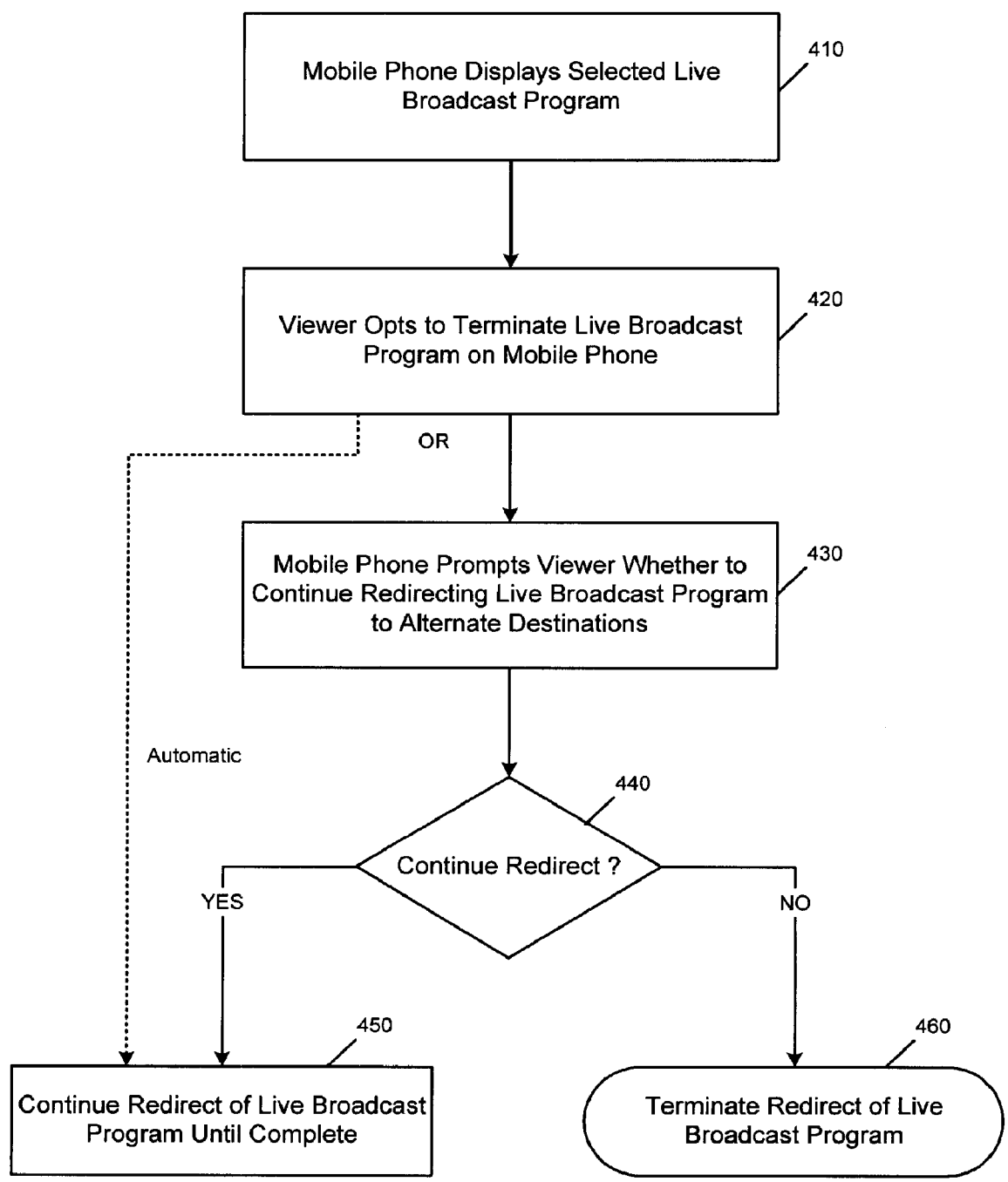
FIG. 4 is a flow chart further describing a method for controlling the destination of broadcast mobile television signals in accordance with an embodiment of the present invention.

In another embodiment of the present invention, as discussed with respect to methods 300 and 400 of FIGS. 3 and 4, respectively, a third party recorder such as a notebook computer 150 or a third party record playback application server such as a home media server 160 may be options to receive the redirected broadcast signals and to record the programming carried by the redirected broadcast signals. The third party devices 150, 160 may be connected to the Internet 140 to receive the redirected broadcasted program. Then, at a later date, the user can access the third party devices 150, 160 and play back the recorded programming. In the case of a notebook computer 150 (or other like device) the user can access the redirected broadcast directly via the computer and a suitable application hosted thereon. In the case of a home media server 160 (or other like device) the user can access the redirected broadcast via a television 170 (or television monitor) that is connected to the home media server 160. The combination of the home media server 160 and television 170 would include a suitable application for retrieving, manipulating, and viewing the redirected broadcasted program.

Use of a third party device 150, 160 as a destination for redirected programming would typically be accomplished via an Internet 140 connection, preferably a broadband connection, between the mobile TV service provider 132 and the selected third party device(s) 150, 160. The user can control the destination of programming from his portable mobile communications device 110 using its ability to wirelessly communicate with B-RAN 130 either directly or through M-RAN 120 which can also be coupled with B-RAN 130. The redirect application running on the portable mobile communications device 110 can send control signals to mobile TV service provider 132 indicating the destination preference(s) of selected programming. If one or more of the selected preferences is a third party device 150, 160 then the mobile TV service provider 132 will, via its own redirect application 136, simultaneously direct a stream of video via the Internet 140.

FIG. 3 is a flow chart of a method for controlling the destination of broadcast mobile television signals in accordance with an embodiment of the present invention. The exemplary operations and functions illustrated in method 100 may be performed by a portable mobile communications device 110 or partly by a communications device, communications system or network, mobile television service provider 132 or the like and partly by the portable mobile communications device 110 or any combination thereof.

In block 310, the user invokes the TV viewing application resident within or attached to the mobile TV portable mobile communications device 110. In block 320, the user can then access and view a programming guide channel that illustrates the current and future programming available on the channels receivable by the portable mobile communications device 110. The receivable channels are likely the result of a subscription agreement between the user of the portable mobile communications device 110 and the mobile television service provider 132. In block 330, the user will navigate the programming channel guide using the keypad, function buttons, and/or joystick 214 of the portable mobile communications device 110 until he finds and selects a program of interest. In block 340, the redirect application 222 prompts the user via the portable mobile communications device display 212 for one or more destinations for the selected program. In block 350, the user/viewer then selects one or more of the destination options. The default option is the portable mobile communications device 110. If the user desires to simultaneously re-direct the selected program to another device such as a notebook computer 150 or a home media server 160, he can select those options as well.

In block 360, the redirect application 222 will process the user's selection and direct the broadcasted program to the desired destinations. This is accomplished by wirelessly sending a control signal to the mobile TV service provider with instructions to simultaneously redirect the selected broadcast program from the mobile TV service provider to the selected destinations.

The viewer can also initiate redirection of a broadcast in the middle of a program 370, not just at the beginning. In this scenario, the viewer is already watching a program that they opted not to redirect earlier. At some point, the viewer decides to simultaneously redirect the broadcast to an alternative destination. The viewer, in block 380, via the user interface, invokes the redirect application and requests that the current program be redirected to one or more alternative destinations. The program is then routed accordingly as described in block 360.

FIG. 4 is a flow chart further describing a method for controlling the destination of broadcast mobile television signals in accordance with an embodiment of the present invention. More specifically, FIG. 4 addresses a situation when the user is currently viewing a broadcast program on his portable mobile communications device 110 while also redirecting the broadcast program to another device but must discontinue viewing for one reason or another. In block 410, the portable mobile communications device 110 is displaying the selected broadcast program. In block 420, the user opts to terminate viewing the selected broadcast program prematurely.

Since this program is being simultaneously redirected to a third party device 150, 160 the user can be prompted in block 430 whether the program should continue to be redirected to the other destination(s). The alternative is to automatically continue redirection of the program without a prompt to the user. This option can be set by the user/viewer.

In block 440, the user selects either to continue redirection of the program or to terminate redirection of the program. If the user opted to continue redirection of the program, then the mobile television service provider 132 will complete the task of redirecting the broadcast program to the selected destinations. If the user opted to terminate redirection of the program, then the mobile television service provider 132 will, in block 460, terminate the task of redirecting the broadcast program to the selected destinations.

The mobile television service provider 132 is responsible for accruing and tallying the fee to be charged to the user/mobile television subscriber. The fee can be based on data throughput, number of destinations, flat fee per program per destination, or any other agreed upon system.

Any prompts associated with the invention may be presented and responded to via an interactive voice feature, a graphical user interface (GUI) presented on the display of the portable mobile communications device or the like.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A portable mobile communications device for controlling the destination of mobile TV programs broadcast by a mobile TV service provider comprising:

a mobile TV device;

a processor running a mobile TV redirect application communicable with the mobile TV service provider;

a user interface for controlling the mobile TV device and the mobile TV redirect application, such that mobile TV broadcast programs can be simultaneously redirected to an external device in response to input received by the user interface and sent to the mobile TV service provider wherein the redirection of the selected broadcast program from the mobile TV service provider to one or more destinations can be terminated when input is received from the user interface on the portable mobile communications device, wherein the input for terminating the current broadcast from the mobile TV service provider to the portable mobile communications device comprises:

prompting, via an interactive voice feature on the portable mobile communications device, whether to terminate the redirection of the selected broadcast program from the mobile TV service provider to one or more destinations:

receiving input in response to the prompt whether to terminate the redirection of the selected broadcast program from the mobile TV service provider to one or more destinations: and causing, via wirelessly sending a control signal to the mobile TV service provider, termination of redirecting the selected broadcast program from the mobile TV service provider to the selected one or more destinations.

2. The portable mobile communications device of claim 1 wherein the external device includes a home media server coupled to and communicable with the mobile TV service provider via the Internet.

3. The portable mobile communications device of claim 1 wherein the external device includes a computer device coupled to and communicable with the mobile TV service provider via the Internet.

4. On a portable mobile communications device, a method of controlling the destination of mobile TV programs broadcast by a mobile TV service provider to the portable mobile communications device, the method comprising:

receiving input from a user interface on the portable mobile communications device, the input for selecting a broadcast program from a programming channel guide to be broadcast;

prompting, via an interactive voice feature a-display-on the portable mobile communications device, for one or more destinations for the selected broadcast program; receiving input from a user interface on the portable mobile communications device, the input for identifying one or more destinations for the selected broadcast program; and causing the redirection of the selected broadcast program from the mobile TV service provider simultaneously to the selected one or more destinations, wherein the redirection of the selected broadcast program from the mobile TV service provider to one or more destinations can be terminated when input is received from the user interface on the portable mobile communications device, wherein the input for terminating the current broadcast from the mobile TV service provider to the portable mobile communications device comprises:

prompting, via an interactive voice feature on the portable mobile communications device, whether to terminate the redirection of the selected broadcast program from the mobile TV service provider to one or more destinations:

receiving input in response to the prompt whether to terminate the redirection of the selected broadcast program from the mobile TV service provider to one or more destinations; and causing, via wirelessly sending a control signal to the mobile TV service provider, termination of redirecting the selected broadcast program from the mobile TV service provider to the selected one or more destinations.

5. The method of claim 4 wherein causing the redirection of the selected broadcast program from the mobile TV service provider simultaneously to the selected one or more destinations comprises processing the received input for identifying one or more destinations for the selected broadcast program and wirelessly sending a control signal to the mobile TV service provider with instructions to redirect the selected broadcast program from the mobile TV service provider simultaneously to the selected one or more destinations.

6. The method of claim 5 wherein destinations includes a home media server coupled with the mobile TV service provider via the Internet.

7. The method of claim 5 wherein destinations includes a computer coupled with the mobile TV service provider via the Internet.

8. On a portable mobile communications device, a computer readable medium containing computer program code for a computer program product for controlling the destination of mobile TV programs broadcast by a mobile TV service provider to the portable mobile communications device, the computer readable medium comprising:

computer program code for receiving input from a user interface on the portable mobile communications device, the input for selecting a broadcast program from a programming guide channel to be broadcast;

computer program code for prompting, via an interactive voice feature on the portable mobile communications device, for one or more destinations for the selected broadcast program;

computer program code for receiving input from a user interface on the portable mobile communications device, the input for identifying one or more destinations for the selected broadcast program; and computer program code for causing the redirection of the selected broadcast program from the mobile TV service provider simultaneously to the selected one or more destinations wherein the computer program code for redirection of the selected broadcast program from the mobile TV service provider to one or more destinations can be terminated when input is received from the user interface on the portable mobile communications device, wherein the input for terminating the current broadcast from the mobile TV service provider to the portable mobile communications device comprises:

computer program code for prompting, via an interactive voice feature on the portable mobile communications device, whether to terminate the redirection of the selected broadcast program from the mobile TV service provider to one or more destinations:

computer program code for receiving input in response to the prompt whether to terminate the redirection of the selected broadcast program from the mobile TV service provider to one or more destinations: and computer program code for causing, via wirelessly sending a control signal to the mobile TV service provider, termination of redirecting the selected broadcast program from the mobile TV service provider to the selected one or more destinations.

9. The computer readable medium of claim 8 wherein the computer program code for causing the redirection of the selected broadcast program from the mobile TV service provider simultaneously to the selected one or more destinations comprises computer program code for processing the received input for identifying one or more destinations for the selected broadcast program and wirelessly sending a control signal to the mobile TV service provider with instructions to redirect the selected broadcast program from the mobile TV service provider simultaneously to the selected one or more destinations.

* * * * *

UNITED STATES PATENT AND TRADEMARK OFFICE
CERTIFICATE OF CORRECTION

PATENT NO. : 7,551,918 B2  Page 1 of 1
APPLICATION NO. : 11/163645
DATED : June 23, 2009
INVENTOR(S) : Toby John Bowen and Leland Scott Bloebaum It is certified that error appears in the above-identified patent and that said Letters Patent is hereby corrected as shown below:

Column 9, line 13, please delete "a-display-"

Signed and Sealed this

First Day of September, 2009

David J. Kappos
*Director of the United States Patent and Trademark Office*